United States Patent [19]
Hossack

[11] Patent Number: 6,045,506
[45] Date of Patent: Apr. 4, 2000

[54] ULTRASONIC IMAGING METHOD AND APPARATUS FOR ADJUSTING TRANSMITTED POWER LEVELS

[75] Inventor: John A. Hossack, Palo Alto, Calif.

[73] Assignee: Acuson Corporation, Mountain View, Calif.

[21] Appl. No.: 09/144,586

[22] Filed: Aug. 31, 1998

[51] Int. Cl.[7] .................................................. A61B 8/00
[52] U.S. Cl. ............................................................ 600/443
[58] Field of Search .................................. 600/437, 443, 600/447, 455–456, 458

[56] References Cited

U.S. PATENT DOCUMENTS

| | | | |
|---|---|---|---|
| 4,318,413 | 3/1982 | Iinuma et al. | 600/447 X |
| 5,113,706 | 5/1992 | Pittaro | 600/447 X |
| 5,640,959 | 6/1997 | Hara et al. | 600/447 |
| 5,676,149 | 10/1997 | Yao | 600/437 |
| 5,891,038 | 4/1999 | Seyed-Bolorforosh et al. | 600/447 |

*Primary Examiner*—Francis J. Jaworski
*Attorney, Agent, or Firm*—Brinks Hofer Gilson & Lione

[57] ABSTRACT

An ultrasonic imaging system adjusts transmitted power level as a function of steering angle to provide a substantially constant insonification intensity index at a given range over a number of scan lines.

31 Claims, 3 Drawing Sheets

ULTRASONIC IMAGING METHOD AND APPARATUS FOR ADJUSTING TRANSMITTED POWER LEVELS

BACKGROUND

The present invention relates to ultrasonic imaging, and it provides particular advantages when used in ultrasonic harmonic imaging, in which the image signal is acquired at a harmonic of the transmitted fundamental signal.

In ultrasonic harmonic imaging, the strength of the harmonic echo signal varies as a non-linear function of the intensity of the transmitted beam. In the past, transmitted power levels have been set according to the intensity levels reached at the central transmit line. The actual transmitted power levels will generally be slightly reduced at steering angles other than that of the central line, due to the angular response rolloff of the transducer elements and the reduced effective aperture size for noncentral transmit lines.

SUMMARY

The present invention is defined by the following claims, and nothing in this section should be taken as a limitation on those claims. By way of introduction, the method and apparatus described below adjust transmitted power levels in such a way as to provide more uniform insonification pressures at a given range across the frame. By maintaining transmitted power levels more nearly constant across the frame, the echo intensity is maintained more nearly constant. This is particularly important for harmonic echoes, which as explained above vary as a non-linear function of the transmitted power level.

DETAILED DESCRIPTION OF THE PRESENTLY PREFERRED EMBODIMENTS

Figure 1:
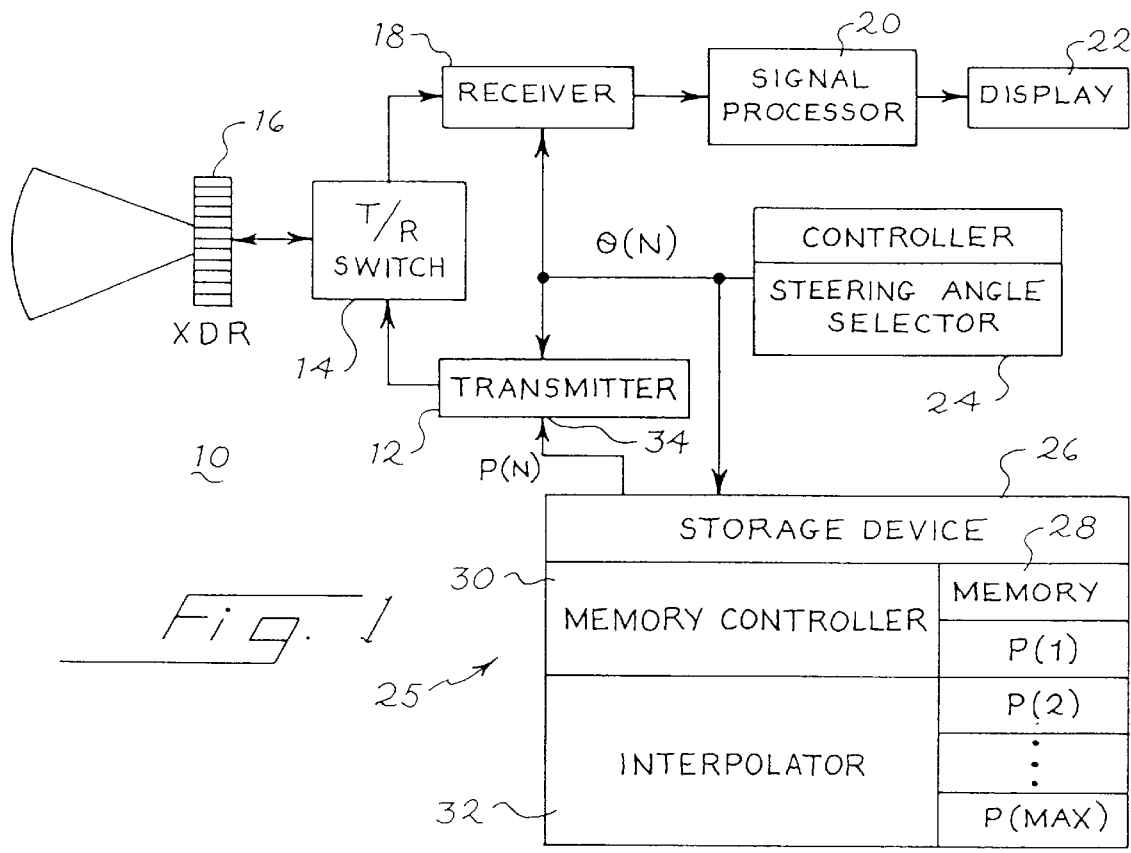
FIG. 1 is a block diagram of an ultrasonic imaging system that incorporates a preferred embodiment of this invention.

Turning now to the drawings, FIG. 1 shows a schematic diagram of an ultrasonic imaging system 10 that incorporates a preferred embodiment of this invention.

The imaging system 10 includes a transmitter 12 that is coupled to a transducer array 16 via a transmit/receive switch 14. The transmit/receive switch 14 also couples the transducer array 16 to a receiver 18. The transmitter 12 transmits ultrasonic scan lines into a target via the transducer 16, and the receiver 18 focuses echo signals from the target along receive lines. These echo signals are applied to a signal processor 20 that generates image signals for display on a display 22. The steering angles θ(N) for the transmit beams are selected by a steering angle selector 24.

All of the features of the system 10 described above are conventional and can be implemented using any suitable technology. For example, digital or analog transmitters, receivers and signal processors can be used, and any suitable transducer (including one dimensional, 1.5 dimensional and 2 dimensional arrays, planar or curved) can be used.

According to this invention, the system 10 includes a power level adjusting subsystem 25 that receives as an input a signal θ(N) from the steering angle selector 24 and supplies as an output signal a transmitted power parameter P(N). The transmitted power parameter P(N) is applied to a transmitter control input 34 and operates to control the transmitter 12 to provide the desired insonification intensity.

Figure 3:
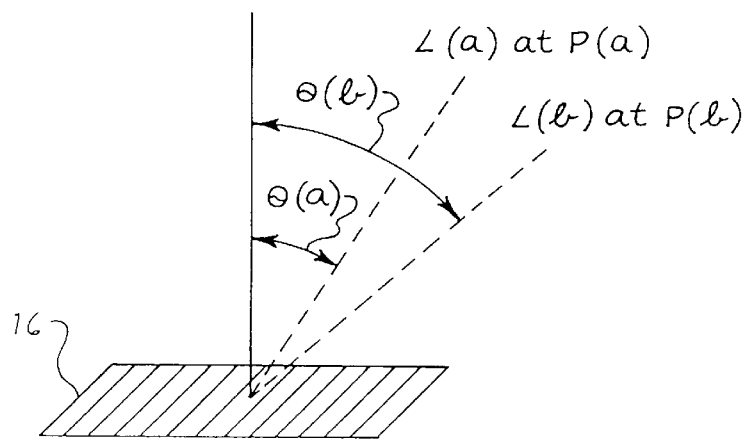
FIG. 3 is a schematic diagram of an ultrasonic transducer showing two transmitted scan lines.

FIG. 3 is a schematic diagram that shows two transmitted scan lines L(a) and L(b). Each of the scan lines is situated at a respective steering angle θ(a), θ(b) with respect to a line normal to the face of the transducer 16. Each of the scan lines L(a), L(b) is characterized by a respective transmitted power parameter P(a), P(b).

Returning to FIG. 1, the power level adjusting subsystem 25 includes a storage device 26 that operates as a means for providing transmitted power parameters. The storage device 26 includes a memory 28 that stores an array of power parameters P(1), P(2), . . . P(max). The subsystem 25 also includes a memory controller 30 that is responsive to the input signal θ(N) to retrieve corresponding ones of the stored power parameters P(N). The selected power parameter P(N) is applied to the transmitter control input 34 by the memory controller 30, and the memory controller 30 therefore operates as a means for applying the selected power parameter P(N) to the control input.

If desired, the subsystem 25 can include an interpolator 32 that interpolates between stored power parameters P(1), P(2) . . . P(max) to allow a relatively coarsely sample set of power parameters to be stored in the memory 28. The memory 28 can store a large array of parameters P(N), with selected rows or columns of the array appropriate for alternative transducer types and imaging modes. For example, the desired values of P(N) can vary according to depth of imaging, depth of focus, number of foci, and imaging mode.

Figure 2:
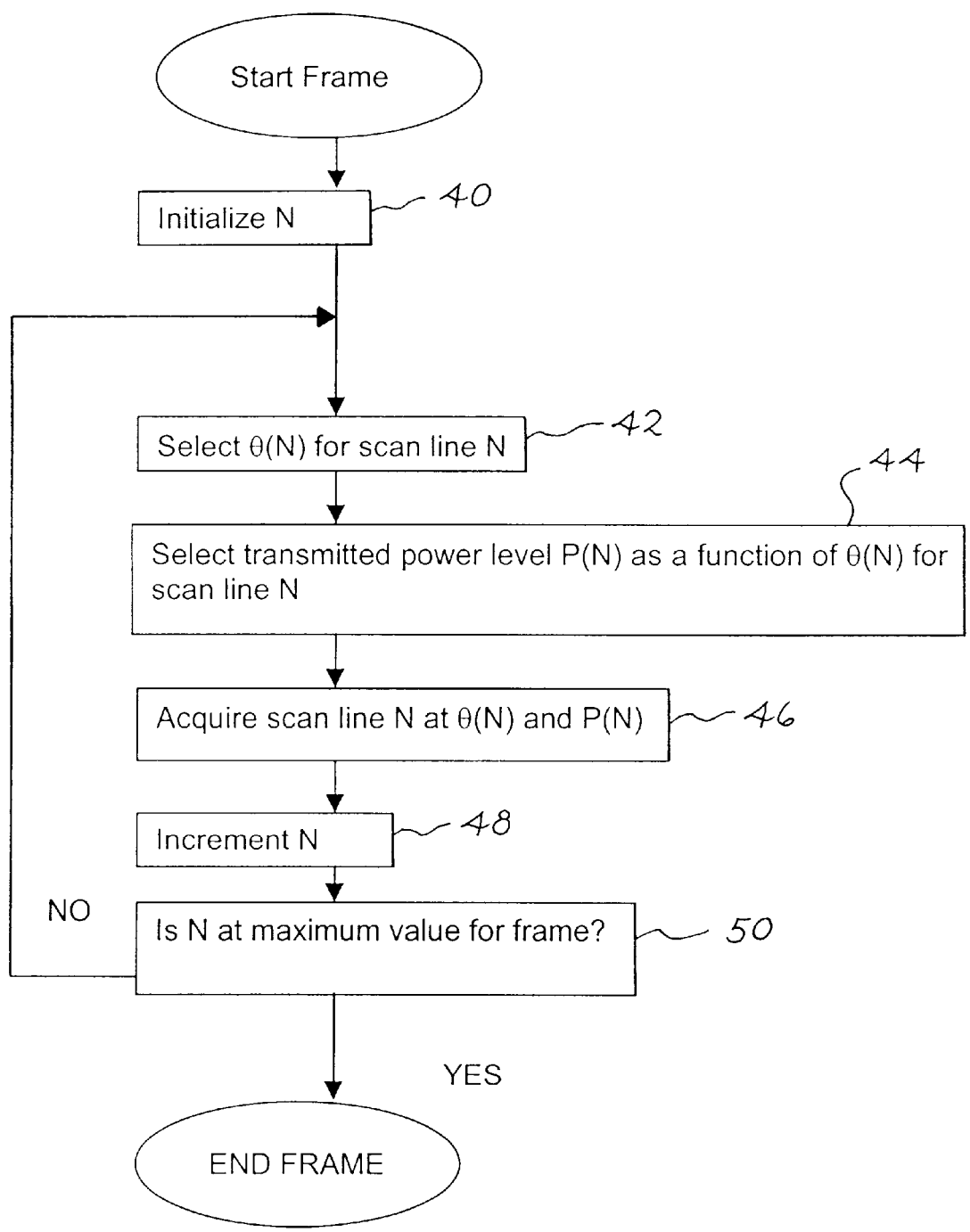
FIG. 2 is a flow chart of a method implemented by the imaging system of FIG. 1.

FIG. 2 provides a flow diagram of a method practiced by the imaging system 10 of FIG. 1. In this method, multiple scan lines are acquired to form a frame of image data. In step 40 a parameter N is initialized for the start of the frame. This parameter N can be thought of as representing the scan line number. In step 42 the steering angle θ(N) is selected for scan line N (by the steering angle selector 24 of FIG. 1), and in step 44 the transmitted power level P(N) is selected as a function of θ(N) (by the memory controller 30 of FIG. 1).

Once θ(N) and P(N) have both been selected, the scan line N is acquired in step 46. During this acquisition step 46, the transmitter 12 applies transmit pulses to the transducer 16 to form a transmitted beam along the desired steering angle θ(N), and the receiver 18 forms a receive scan line generally aligned with the steering angle θ(N). The transmitted beam is characterized by a fundamental component at the frequency of peak transmitted ultrasonic power. The receiver 18 can be selected to be responsive to the same fundamental frequency. Alternately, the receiver 18 can be selected to be responsive to a harmonic of the fundamental frequency such as a second harmonic, third harmonic, or subharmonics. In this case the target being imaged can either be organic tissue (such as naturally occurring tissue), that is free of added contrast agent, or organic tissue that bears contrast agent such as conventional microbubbles.

After step 46 of FIG. 2, the scan line number N is incremented in step 48 and compared with a maximum value in step 50. Depending upon the outcome of this comparison, the method of FIG. 2 terminates, or control is returned to step 42. In this way an entire frame of scan lines is acquired.

Returning to FIG. 3, the method of FIG. 2 selects transmitted power levels P(a), P(b) for scan lines L(a), L(b). Generally speaking, when L(a) is situated more centrally than L(b), then the transmitted power level P(a) that will be somewhat less than the transmitted power level P(b). In general, the transmitted power levels P(a), P(b) are chosen to provide a substantially constant insonification intensity index in the target at a given range.

The transmitted power parameters P(N) can take various forms in alternative embodiments. For example, in one embodiment P(N) can be indicative of the transmitter power. As the imaging system scans across various steering angles, the transmitter power level or voltage amplification level is varied according to P(N). Voltage level control can be implemented by varying the gain of amplifiers included in the transmitter 12 or by selecting a suitable high voltage rail from among a number of available high voltage rail options. In a system wherein the transmit wave is defined digitally, the variable gain can be implemented as a digital multiplication operation prior to digital to analog conversion, as a low-voltage variable gain step prior amplification to high voltage level, or as a variable high voltage amplifier gain. At present, varying the gain at the low-voltage, analog level is preferred for some applications.

Figure 4:
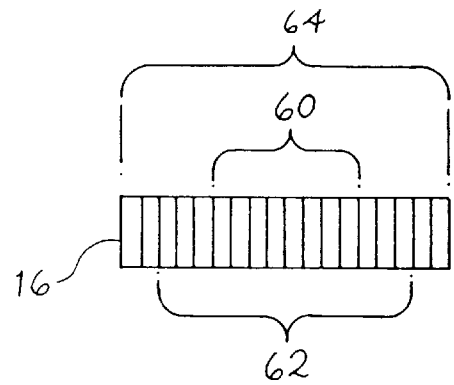
FIG. 4 is a schematic plan view of an ultrasonic transducer showing three aperture sizes.

Alternately, the transmitted power parameter P(N) can be used to indicate the aperture size to be used for the transducer 16. As shown in FIG. 4, three separate apertures 60, 62, 64 can be used. The aperture 60 is the smallest of the three and the aperture 64 is the largest of the three. The transmitted power parameter P(N) can select one of the available apertures to achieve the desired transmitted power level.

Returning to FIG. 1, the power parameters P(N) stored in the memory 28 can be scalar quantities or vector quantities. When scalar quantities are used, the same power parameter is applied to all transducer elements in the transducer 16 for a given scan line (at least for the active aperture). When the power parameter P(N) is a vector quantity, variable power levels can be used on various transducer elements to achieve the desired mean insonification intensity.

In general, the power parameters P(N) can be selected as appropriate for any given ultrasonic imaging system 10 either according to theoretical considerations or actual measurements. One approach is to decide on the required insonification intensity that is to be used for the center scan line ($\theta$=0). This insonification intensity may be set by government regulation (e.g., FDA Mechanical Index limitations) or by transmitter output considerations. Once the insonification intensity for the center scan line has been selected, the transmitted power for all scan lines having $\theta$ not equal to zero is selected such that the insonification intensities obtained in the field at approximately the same ranges match for all of the scan lines. If the system is transmit voltage limited, this may require using a lower than maximum voltage for the center scan line so that maximum voltage may be used for non-center scan lines. The variation of P(N) as a function of steering angle $\theta$ may be based on empirical observations of ultrasonic field levels in a water bath using a hydrophone. Alternately, theoretical considerations may be used, based on the rolloff characteristic of a transducer element and the effective aperture size normal to the steered beam.

The insonification intensity index that is held substantially constant at a given range over multiple steering angles can vary depending upon the application. As used herein, the term "insonification intensity index" is intended to encompass any suitable measure of acoustic intensity, including but not limited to the following:

1. Mechanical Index—Mechanical index is an FDA regulated parameter defined as peak rarefactional pressure in MPa divided by the square root of the center frequency in MHz. Current FDA regulations limit the mechanical index to a maximum value of 1.9, after allowing for tissue-related, frequency-dependent attenuation.
2. Intensity Spatial Peak Pulse Average (ISPPA)—This is another index of insonification intensity that is measured in terms of watts per square centimeter.
3. Intensity Spatial Peak Time Average (ISPTA)—This is another FDA regulated parameter that is also measured in terms of watts per square centimeter.
4. Peak rarefactional pressure (MPa).

Those skilled in the art will recognize that other insonification intensity indexes may be appropriate for selected applications, and this term is therefore intended to be interpreted broadly.

Transducer intensity rolloff as a function of steering angle $\theta$ is a function of transducer element dimension and the quality of isolation between transducer elements. Typically, isolation is imperfect, and this causes a transducer element to be slightly more directional than would be predicted by theory. The theoretical response of a transducer element as a function of element width and frequency may be estimated from equations appearing in the text Acoustic Waves by Gordon S. Keno (Prentice Hall Inc.) 1997, Chapter 3:

$$P(\theta) = P(0) \left[ \frac{\sin\left(\frac{\Pi W \sin\theta}{\lambda}\right)}{\left(\frac{\Pi W \sin\theta}{\lambda}\right)} \right], \quad \text{(Eq. 1)}$$

where $\theta$ equals the azimuthal steering angle (0 for the central scan line), W equals the width of an individual transducer element measured along the azimuthal axis, and $\lambda$ equals the wavelength of the ultrasonic signal.

If the transducer face is nonrigid, as is generally the case, the foregoing expression is multiplied by $\cos(\theta)$. Furthermore, if the transmitted beam is steered, the effective width of the transducer array aperture, perpendicular to the beam direction, shortens according to a cosine $\theta$ steering angle relationship. The shortening also changes the shape of the beam and makes the beam spread out, since small apertures are associated with greater depths of field and wider focused beams.

Taking account of these various effects and the fact that transducers typically perform differently from theoretical expectations, it is generally preferred that the transducer be experimentally scanned in a water tank using a constant transmitter voltage level, and that the insonification intensity index be measured for all steering angles of interest. Assuming linearity, the transmitter voltage levels for those angles having an intensity index less than the maximum (which is typically observed at or near the center of the frame where $\theta$=0) may be scaled upwardly until all scan lines throughout the steering angle range of interest provide a similar intensity index at the same range.

If the acoustic output is being measured in terms of watts, then the acoustic output is related to the square of the applied voltage for the transmitter 12. This fact should be taken into account when calculating the values of P(N). In some cases, nonlinearity will be observed in the response, and it will be advantageous to modify P(N) to take this factor into account. This may require experimental adjustment to input levels until uniform output responses are obtained.

As the transmitted power level is increased for large values of θ, it is preferable to ensure that the insonification intensity immediately at the face of the transducer 16 remains at safe levels. It may also be preferable to vary the transmitter voltage level to a lesser extent if it is noticed that transducer surface heating rises to undesirable levels due to the increased applied voltage. In the case of B-mode imaging, transducer surface heating is typically not a problem, but transducer surface heating can be a problem in the case of certain Doppler modes such as Color Doppler Imaging.

Figure 5:
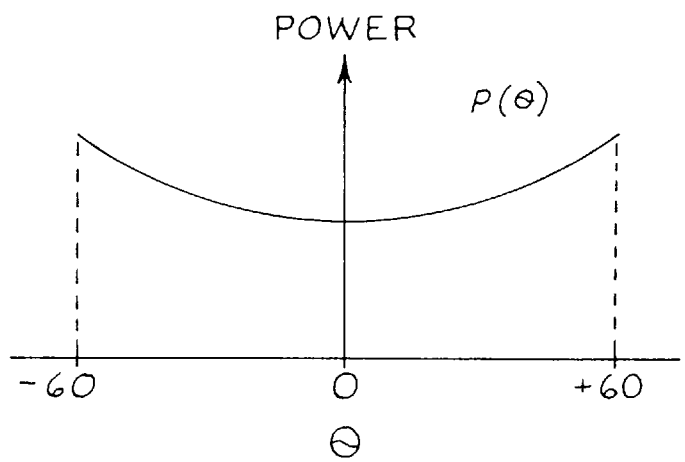
FIG. 5 is a graph showing a preferred variation of transmitter power level as a function of steering angle.
Figure 6:
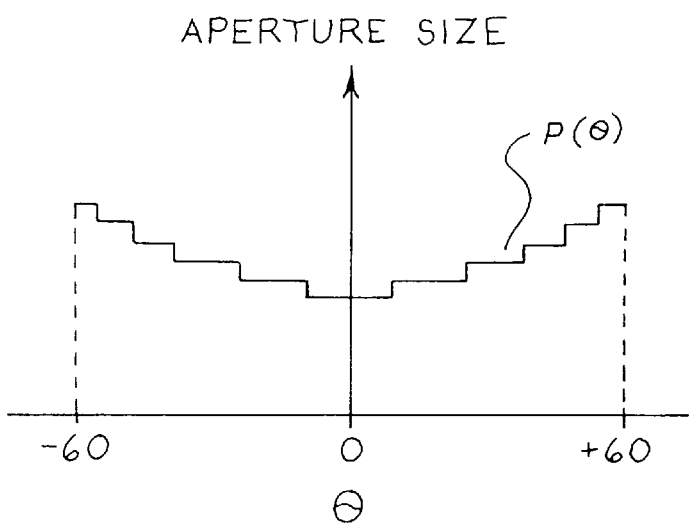
FIG. 6 is a graph showing a preferred variation of aperture size as a function of steering angle.

By way of example, FIGS. 5 and 6 show exemplary values of P(θ), where P(θ) is indicative of transmitter power level (FIG. 5) and aperture size (FIG. 6).

It should be recognized that the present invention can be used for a wide variety of ultrasonic imaging systems, including systems that generate single or multiple simultaneous transmit beams, and systems that receive single or multiple simultaneous receive beams. The ultrasonic imaging system can operate in any suitable imaging mode such as B-mode, color Doppler, pulse wave, continuous wave, tissue harmonic, contrast harmonic, Doppler tissue intensity, and so forth. The present invention can be applied to ultrasonic imaging systems that operate with multiple focal points, with line focus systems, compound focus systems or the like. As explained above, the imaging system 10 can operate in either a harmonic or a fundamental imaging mode, and contrast using agent may be injected into the tissue or not, as desired.

As used herein, the term "steering angle" is intended broadly to encompass a steering angle in any plane, including azimuthal steering angle and/or elevational steering angle.

The term "as a function of" is also intended broadly to encompass direct and indirect functions. Thus, the power parameter P is said to be a function of the steering angle θ even in the situation where the power parameter P is a function of scan line N, and scan line N is a function of steering angle θ.

The term "substantially constant" is intended to encompass a difference between the insonifiction intensity index for the central and lateral scan lines (typically separated by 35° or more) that is less than 20%, preferably less than 10%, and most preferably less than 5%. The goal in having the insonification intensity index substantially constant at a given range over a plurality of steering angles is to achieve an echo response that is substantially constant as seen by an ordinary user across the frame.

As used herein the term "tissue" is intended broadly to encompass all organic structures, including blood, soft tissue and bones.

The term "contrast agent" is intended to refer to added substances such as microbubbles selected to provide ultrasonic echo responses of a desired type.

It should be apparent from the foregoing detailed description that the preferred embodiment described above provides the advantage that the sound intensity index is more nearly at the optimal level for a range of steering angles. For this reason, echo intensities and in particular echo intensities for nonlinear echoes are more nearly consistent from one scan line to another.

It should be understood that the foregoing detailed description has described only a few of the many embodiments that are possible for the present invention. For example, the means for providing transmitted power levels is not limited to the form shown in FIG. 1. The providing means may or may not include an interpolator and it may or may not include a digital memory. In alternative embodiments an analog function generator can be used. It is therefore intended that the foregoing detailed description be regarded as an illustration of selected forms of the invention and not as a definition of the invention. It is only the following claims, including all equivalents, that are intended to define the scope of this invention.

I claim:

1. A method for adjusting transmitted power levels in an ultrasonic imaging system, said method comprising:

(a) selecting a first transmitted power level for a first transmit line as a function of a first steering angle associated with the first transmit line;

(b) selecting a second transmitted power level for a second transmit line as a function of a second steering angle associated with the second transmit line, said first transmit line situated more centrally than the second transmit line and said second transmitted power level being greater than said first transmitted power level;

wherein the first and second transmit lines are separated by an angle of at least 35°, and wherein the insonification intensity index for the second transmit line at a given range is no more than X% less than the insonification intensity index for the first transmit line at the given range, where X is less than or equal to 20.

2. The method of claim 1 wherein the first and second transmitted power levels are selected to provide a substantially constant insonification intensity index at a given range.

3. The method of claim 1 wherein X is less than or equal to 10.

4. The method of claim 1 where X is less than or equal to 5.

5. A method for imaging with adjusted transmitted power levels in an ultrasonic imaging system, said method comprising:

(a) transmitting a plurality of transmit lines, said transmit lines differing in steering angle, each transmit line associated with respective transmitted power level, said transmit lines characterized by a fundamental frequency;

(b) varying the transmitted power levels during (a) as a function of steering angle to provide a substantially constant insonification intensity index at a given range over a plurality of steering angles; and (c) imaging echoes of the transmit lines of (a) at a harmonic of the fundamental frequency.

6. The method of claim 5 wherein (b) comprises adjusting a transmitter power level as a function of steering angle.

7. The method of claim 5 wherein (b) comprises adjusting a transmitter aperture size as a function of steering angle.

8. The method of claim 5 wherein the echoes imaged in (c) are created at least in part by a contrast agent.

9. The method of claim 5 wherein the echoes imaged in (c) are created substantially entirely by organic tissue which is free of added contrast agent.

10. The method of claim 5 wherein the transmit lines comprise first and second transmit lines that differ in steering angle by at least 35°, and wherein the insonification intensity index for the second transmit line is no more than X% less than the insonification intensity index for the first transmit line at the given range, where X is less than or equal to 20.

11. The method of claim 10 where X is less than or equal to 10.

12. The method of claim 10 where X is less than or equal to 5.

13. A subsystem for adjusting transmitted power levels in an ultrasonic imaging system comprising a transmitter, a transmitter control input, and a steering angle selector, said subsystem comprising:

means for providing a plurality of transmitted power parameters; and means, coupled to the providing means and responsive to the steering angle selector, for applying selected ones of the transmitted power parameters to the transmitter control input as a function of steering angle to cause the transmitter to provide a substantially constant insonification intensity index at a given range over a plurality of transmit lines at respective steering angles;

wherein the transmit lines comprise first and second transmit lines that differ in steering angle by at least 35°, and wherein the insonification intensity index for the second transmit line is no more than X% less than the insonification intensity index for the first transmit line at the given range, where X is less than or equal to 20.

14. The invention of claim 13 wherein the transmitted power parameters are indicative of respective power levels of the transmitter.

15. The invention of claim 13 wherein the transmitted power parameters are indicative of respective aperture sizes of the transmitter.

16. The invention of claim 13 wherein the providing means comprises a memory operative to store said transmitted power parameters.

17. The invention of claim 13 wherein the providing means comprises a memory operative to store a portion of said transmitted power parameters and an interpolator responsive to the stored transmitted power parameters to generate additional ones of the transmitted power parameters.

18. The invention of claim 13 where X is less than or equal to 10.

19. The invention of claim 13 where X is less than or equal to 5.

20. A subsystem for adjusting transmitted power levels in an ultrasonic imaging system comprising a transmitter, a transmitter control input, and a steering angle selector, said subsystem comprising:

a storage device storing a plurality of transmitted power parameters;

a storage device controller coupled to the storage device and the transmitter control input, said controller responsive to the steering angle selector to select one of the transmitted power parameters as a function of steering angle and to apply the selected transmitted power parameter to the transmitter control input;

said transmitter operative to provide a transmit aperture that is at least as large for a second, peripheral steering angle as for a first, central steering angle.

21. The invention of claim 20 wherein the transmitted power parameters are indicative of respective power levels of the transmitter.

22. The invention of claim 20 wherein the transmitted power parameters are indicative of respective aperture sizes of the transmitter.

23. The invention of claim 20 wherein the storage device comprises a memory coupled with the storage device controller.

24. The invention of claim 23 wherein the storage device further comprises an interpolator coupled with the storage device controller.

25. A method for imaging with adjusted transmitted power levels in an ultrasonic imaging system, said method comprising:

(a) selecting a first transmitted power level for a first transmit line said first transmit line characterized by a fundamental frequency;

(b) selecting a second transmitted power level for a second transmit line said second transmit line characterized by the fundamental frequency, said first transmit line situated more centrally than the second transmit line and said second transmitted power level being greater than said first transmitted power level, wherein the first and second transmitted power levels are selected to provide a substantially constant insonification intensity index at a given range; and (c) imaging echoes of the transmit lines of (a) and (b) at a harmonic of the fundamental frequency.

26. The method of claim 25 wherein the first and second transmit lines are separated by an angle of at least 35°, and wherein the insonification intensity index for the second transmit line at the given range is no more than X% less than the insonification intensity index for the first transmit line at the given range, where X is less than or equal to 20.

27. The method of claim 26 where X is less than or equal to 10.

28. The method of claim 26 where X is less than or equal to 5.

29. The method of claim 1 or 25 wherein the first and second transmit lines are associated with respective first and second transmit apertures, and wherein the second transmit aperture is no smaller than the first transmit aperture.

30. The method of claim 29 wherein the second transmit aperture is larger than the first transmit aperture.

31. The method of claim 1 or 25 wherein the first and second transmit lines are adapted for a common imaging mode.

* * * * *